(12) United States Patent
Fisher

(10) Patent No.: US 7,473,453 B2
(45) Date of Patent: Jan. 6, 2009

(54) HEAT-RESISTANT, PAINTABLE TWO-SIDED ACRYLIC-BASED ADHESIVE TAPE

(75) Inventor: Dennis K. Fisher, Brooklyn, MI (US)

(73) Assignee: Adco Products, Inc., Michigan Center, MI (US)

( * ) Notice: Subject to any disclaimer, the term of this patent is extended or adjusted under 35 U.S.C. 154(b) by 306 days.

(21) Appl. No.: 11/052,357

(22) Filed: Feb. 7, 2005

(65) Prior Publication Data

US 2005/0147783 A1    Jul. 7, 2005

Related U.S. Application Data

(63) Continuation-in-part of application No. 10/445,692, filed on May 27, 2003, now Pat. No. 6,852,359, which is a continuation-in-part of application No. 10/266,310, filed on Oct. 8, 2002, now Pat. No. 6,808,775.

(51) Int. Cl.
 B32B 9/00      (2006.01)
 B32B 33/00     (2006.01)
 B32B 7/12      (2006.01)
 B32B 15/04     (2006.01)

(52) U.S. Cl. ............... 428/40.1; 428/41.5; 428/41.7; 428/343; 428/354; 428/355 AC

(58) Field of Classification Search ............... 428/40.1, 428/41.5, 41.7, 343, 354, 41.3, 355 AC
See application file for complete search history.

(56) References Cited

U.S. PATENT DOCUMENTS 3,565,247 A    2/1971 Brochman
4,499,130 A    2/1985 Questel et al.
4,623,413 A    11/1986 Questel et al.
4,855,170 A *  8/1989 Darvell et al. ............. 428/40.2
4,968,558 A    11/1990 Fisher et al.

(Continued)

FOREIGN PATENT DOCUMENTS

EP    0 034 046      5/1981
JP    11029751       2/1999
WO    WO 91/04151    4/1991

OTHER PUBLICATIONS

Adco Products, Inc., Price Quotation dated Sep. 9, 1999 made to Venture Industries for acrylic tape with heat resistant release liner.

(Continued)

*Primary Examiner*—Patricia L Nordmeyer
(74) *Attorney, Agent, or Firm*—Vivacqua Law, PLLC; Raymond J. Vivacqua

(57) ABSTRACT

A heat-resistant, paintable two-sided acrylic-based adhesive tape and method for adhering the tape to two substrates is provided. The tape is comprised of a solid acrylic-based carrier including an acrylic-based adhesive on both sides of the carrier. The carrier preferably includes polymeric microspheres to impart compressibility to the tape. The tape includes a conformable, heat resistant polyolefin-based release liner. In use, the tape is adhered on one side to a first substrate, the liner is removed, and the tape is adhered on the other side to a second substrate. The two substrates with the tape are then exposed to elevated temperatures such as those encountered in an automotive, appliance, or other commercial paint bake process. The tape can withstand temperatures up to 300° F. and can be painted without degradation of the adhesive and without a reduction of the adhesive properties of the tape.

8 Claims, 2 Drawing Sheets

U.S. PATENT DOCUMENTS

| | | | |
|---|---|---|---|
| 5,183,833 A | 2/1993 | Fisher et al. | |
| 5,264,278 A | 11/1993 | Mazurek et al. | |
| 5,354,600 A | 10/1994 | Fisher et al. | |
| 5,385,772 A | 1/1995 | Slovinsky et al. | |
| 5,527,595 A | 6/1996 | Slovinsky et al. | |
| 5,830,571 A | 11/1998 | Mann et al. | |
| 5,907,018 A | 5/1999 | Mazurek et al. | |
| 6,023,898 A | 2/2000 | Josey | |
| 6,048,806 A | 4/2000 | Deeb et al. | |
| 6,117,531 A | 9/2000 | Schacht et al. | |
| 6,299,945 B1 | 10/2001 | Mertz et al. | |
| 6,329,095 B1 * | 12/2001 | Farnworth et al. | 429/48 |
| 6,365,254 B1 | 4/2002 | Zoller et al. | |
| 6,461,725 B1 | 10/2002 | Kanada et al. | |
| 6,808,775 B2 * | 10/2004 | Drath et al. | 428/40.1 |
| 6,841,234 B2 | 1/2005 | Lhila et al. | |
| 6,852,359 B2 * | 2/2005 | Drath et al. | 427/207.1 |
| 6,982,107 B1 * | 1/2006 | Hennen | 428/40.1 |

OTHER PUBLICATIONS

Achilles USE Inc. Product Datasheet, Polyvinyl Chloride Film, reprinted Nov. 24, 2003.

Acrylic Tape Keeps Tight Grip on Costs, Designfax, Jun. 1999, printed at http//www.manufacturing.center.com/dfx/archieves/0699/699just.asp.

Yemm & Hart, Flexisurf (Plasticized PVC) Material Safety Data Sheet, reprinted on May 4, 2004 at http://www.yemhart.com/materials/flexisurf/msds.htm.

* cited by examiner

HEAT-RESISTANT, PAINTABLE TWO-SIDED ACRYLIC-BASED ADHESIVE TAPE

CROSS-REFERENCE TO RELATED APPLICATIONS

This application is a continuation-in-part of U.S. Pat. No. 6,852,359, issued Feb. 8, 2005, which is a continuation-in-part of U.S. Pat. No. 6,808,775, issued Oct. 26, 2004, which claims the benefit of U.S. Provisional Application Ser. No. 60/367,548, filed Mar. 26, 2002. These applications are incorporated herein by reference.

BACKGROUND OF THE INVENTION

The present invention relates to a heat-resistant, paintable acrylic-based adhesive tape. More particularly, the present invention relates to a two-sided acrylic-based adhesive tape and a method of adhering both sides of the tape to two substrates, where the tape can withstand environmental conditions encountered in automotive, appliance, and other commercial paint processes without degradation or a reduction in adhesive properties of the tape.

Acrylic pressure sensitive adhesive tapes are widely used in the automotive and appliance industry to bond a wide variety of substrate materials, and in particular, the application of painted exterior automotive body side moldings, subassemblies or trim parts. A common method of application is to use an acrylic attachment tape comprised of a foam core which adheres the substrate materials to the vehicle or appliance. However, a disadvantage of such foam core tapes is that they cannot withstand exposure to a paint bake cycle in which the part is painted and subsequently exposed to high temperatures in a paint oven to cure the painted part. For example, the foam core loses compressibility after the introduction of paint, thereby reducing the ability of the tape to sufficiently wet-out to the mating surface. In addition, the foam core may also break down as entrapped air in the foam expands at the elevated temperatures encountered in the bake cycle, rupturing the foam's cell structure, which also impedes wet-out and structural strength. Expanded gas can also collect at the tape-surface interface where it interferes with surface wet-out and bond strength.

In order to avoid the degradation of foam core acrylic tapes, the use of a separate masking tape has been employed which is applied to the part prior to the paint bake cycle in the area of the part which is to receive the foam core acrylic attachment tape to prevent that area from receiving paint. The masking tape is then removed after the paint bake cycle and the attachment tape is applied. However, the use of the masking tape adds additional steps and materials to the manufacturing process, which is both time-consuming and costly.

In order to avoid this extra step, the use of adhesive tapes which are heat-resistant have been developed. These adhesive tapes generally comprise a two-sided solid acrylic-based carrier and a heat resistant liner on one side of the carrier. The tape can be attached on one side to a substrate such as an automotive part and then exposed to elevated temperatures such as a paint baking process without being subject to degradation. The liner may be removed at a later time such that the part can be adhered to a second substrate surface, such as the exterior surface of an automobile, which is then subjected to a paint baking process in a separate step.

However, in order to save additional steps, it would be desirable to be able to apply a two-sided adhesive tape to two substrates prior to the paint baking process so that the substrates could be painted simultaneously. Accordingly, there is still a need in the art for a tape which may be applied to two substrates and which is not adversely affected when exposed to paint, primers, and elevated temperatures such as those encountered in automotive, appliance, and other commercial painting processes.

SUMMARY OF THE INVENTION

The present invention meets that need by providing a heat-resistant, two-sided adhesive tape including a solid acrylic-based carrier. The tape is conformable to the shape of the substrate(s) to which it is attached. The tape is also paintable, i.e., it will not degrade as a result of exposure to paints and primers encountered during paint processing.

The tape withstands temperatures up to about 300° F. (150° C.), and eliminates both the need for a separate masking and the need for die cutting when used in the application of paintable automotive parts, appliance trim or subassembly parts, and other painted substrates.

According to one aspect of the present invention, a heat-resistant, two-sided acrylic-based tape is provided comprising a solid acrylic-based carrier having first and second sides, and an acrylic-based adhesive on both sides of the carrier. Preferably, the carrier includes pre-expanded polymeric microspheres therein.

By "solid" carrier, it is meant that the carrier has no added gaseous cells or voids formed by a foaming or frothing process. Thus, the solid carrier, even with the inclusion of microspheres therein, will not absorb paint, nor will any gases entrapped in the tape core result in expansion upon exposure to elevated temperatures.

The heat-resistant tape further includes a conformable, heat resistant release liner comprised of a polyolefin-based material which is adhered to at least one side of the adhesives on the carrier. The release liner is preferably conformable so that it conforms to the surface of the substrate to which the tape is adhered without separating from the tape. To fulfill the requirements of conformability for the present invention, the tape construction (including the liner) must be able to conform to a minimum of a 2-inch radius for a 1-inch wide tape and a 1-inch radius for a 0.5 inch-wide tape. The release liner preferably remains in contact with the tape during shipping and storage prior to use and is also paintable.

The heat-resistant tape can withstand temperatures up to about 300° F. (150° C.) without degradation of the acrylic-based adhesive, and without reducing the bonding properties of the acrylic-based adhesive. The tape is also paintable. By paintable, it is meant that the tape and liner can withstand exposure to paints or primers used in a paint bake cycle without any adverse affects, i.e., without degradation of the acrylic-based adhesive, and without reducing the bonding properties of the acrylic-based adhesive. By "paint bake cycle", it is meant a process in which the tape is preferably adhered on both sides to substrates such as an automotive, appliance, or other commercial parts, primed, painted, and then passed through a paint bake oven which is used to cure the painted parts. The oven temperatures typically range from about 200° F. to 300° F. (80° C. to 150° C.) and cure times range from 25 minutes to 2 hours.

The heat-resistant tape preferably has a peel strength of at least 20 N/cm to the painted substrate(s) after being processed through a paint bake cycle. Preferably, the tape has a thickness of about 0.5 to 2.0 mm.

The heat-resistant tape of the present invention may be applied in a variety of ways. The tape can be adhered to two substrates by adhering one side of the two-sided tape to at least one area of a first substrate, removing the heat resistant liner from the other side of the tape and adhering the other side of the tape to at least one area of a second substrate. The substrates with the tape adhered thereon may then be painted and exposed to temperatures up to 300° F. (150° C.) to cure and dry the paint. Preferred substrate materials include wood, metal, glass, thermoplastic olefins, acrylonitrile-butadiene styrene, and polyvinyl chloride-based materials. The first and second substrates may comprise the same or different materials.

In use, the heat resistant tape is preferably adhered on one side to a first substrate such as an automotive or appliance trim or part, then adhered to a second substrate such as an exterior part of an automobile or appliance, and then passed through a paint bake cycle such that the two substrates are simultaneously painted and/or exposed to heat curing or heat processing operations with the tape adhered to their surfaces.

Accordingly, it is a feature of the present invention to provide a heat-resistant, two-sided acrylic-based adhesive tape which may be adhered on both sides to two substrates and exposed to paint and elevated temperatures such as those encountered in a paint bake cycle without degradation of the tape. Other features and advantages of the invention will be apparent from the following description, the accompanying drawings, and the appended claims.

DETAILED DESCRIPTION OF THE PREFERRED EMBODIMENTS

The heat-resistant, two-sided acrylic-based adhesive tape of the present invention provides a number of advantages over prior acrylic tapes currently used in producing painted automotive exterior trim products, appliance trim, or other commercial painted substrates where a pressure sensitive adhesive tape is used. Use of the conformable, heat-resistant adhesive tape of the present invention eliminates the need for die cutting the tape in order to match the curvature of the substrate. Because the tape is paintable, there is no need for a separate masking tape. And, the tape may be used to adhere two substrates together such that the substrates may be painted simultaneously, which results in substantial savings due to the elimination of manufacturing steps and materials.

Figure 1:
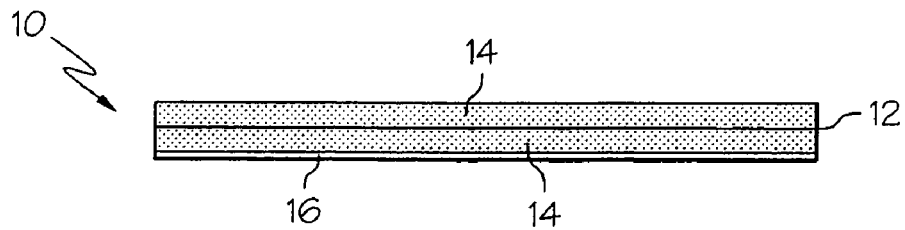
FIG. 1 is a side view of the heat-resistant tape of the present invention.

Referring now to FIG. 1, the heat-resistant two-sided acrylic-based adhesive tape 10 of the present invention is illustrated. The tape includes a solid carrier 12 with an acrylic-based pressure sensitive adhesive 14 on both sides of the carrier. The acrylic-based pressure sensitive adhesive 14 is preferably formulated from a combination of non-tertiary acrylic acid esters of alkyl alcohols and ethylenically unsaturated monomer(s) having at least one polar group. The adhesive is preferably comprised of non-tertiary acrylic acid alkyl esters formed from alcohols having from about 4 to about 12 carbon atoms, and preferably from about 6 to 10 carbon atoms, particularly the non-tertiary acrylic acid alkyl ester, 2-ethylhexyl acrylate. Specific examples of suitable adhesive formulations are disclosed in U.S. Pat. No. 5,354,600, the disclosure of which is incorporated herein by reference.

Crosslinking agents such as di- and triacrylates, may also be included in the adhesive formulation, generally in amounts of from about 0.005 to about 0.5 weight percent, based on total weight of polymer in the adhesive formulation, and more preferably, from about 0.01 to about 0.2 weight percent. Suitable crosslinking agents may also be present such as 1,6 hexane diol diacrylate. Other crosslinking agents including commercially available organofunctional silanes may also be utilized.

The adhesive is preferably formed by at least partially photopolymerizing the formulation by exposure to UV radiation as described in commonly-assigned U.S. Pat. No. 5,183,833, the disclosure of which is hereby incorporated by reference.

A preferred acrylic-based adhesive formulation for use in the present invention includes from about 60-90% by weight 2-ethylhexyl acrylate, 1-20% by weight acrylic acid, about 2% by weight of an initiator, about 2% of a compatible crosslinking agent such as hexane diol diacrylate, about 5% by weight silica, and from about 5-20% by weight polyvinyl acetate. This monomeric formulation is preferably cured to at least 95% by weight solids.

In a preferred embodiment, the acrylic-based carrier for the tape comprises a pressure sensitive adhesive matrix formed from a crosslinked polymer which may include acrylic acid esters of primary or secondary alcohols. The pressure sensitive adhesive matrix preferably includes a filler comprising hollow, pre-expanded polymeric microspheres which are compatible with the matrix. Preferred microspheres for use in the present invention are commercially available from Sovereign Specialty Chemicals under the trade name DUALITE®. Such microspheres are expanded microspheres having a diameter ranging from about 65 to 135 microns. The microspheres are included at a preferred concentration of about 4% by weight (about 62% by volume). The microspheres provide compressibility to the tape and are solvent resistant, heat resistant and shear stable during manufacture of the carrier. The microspheres are stable and heat resistant to temperatures up to 300° F. (150° C.) and above.

The carrier may be formed by extruding a combination of the polymer and filler as described in commonly-assigned U.S. Pat. No. 5,385,772, the disclosure of which is hereby incorporated by reference. The carrier may be comprised of a single material, or a laminate comprised of several layers of dissimilar materials.

The resulting carrier, even with the inclusion of microspheres, is solid, i.e., it has no added gaseous cells, such as cells that would be formed using an inert gas in a foaming or frothing process. Accordingly, the tape will not absorb paint in a paint bake cycle as would occur with the use of a foam core tape. Additionally, the microsphere filler is chosen to be temperature resistant so that the microspheres will not degrade the tape at elevated temperatures such as those encountered in automotive, appliance, or other commercial paint bake or annealing processes.

The tape also preferably includes a conformable liner 16 on one or both sides of the tape to protect the adhesive surfaces of the tape during shipment and storage prior to use. The liner preferably comprises polyolefin-based polymers, but may include other polymer films which possess the desired conformability and heat resistant characteristics. The liner should conform to the substrate to which it is attached and should remain in intimate contact with the tape during use. The liner should not buckle or distort when exposed to elevated temperatures such as those encountered in a paint bake process. A preferred polyolefin-based liner for use in the present invention is available from Achilles USA, Inc. under formulations FPP-1, FPP-2, FPP-4.2 and FPP-4.3. The liner preferably has a thickness of about 0.127 mm to about 0.254 mm.

The tape of the present invention may be provided in a number of forms, including strips which are slit to a desired length. Alternatively, the tape may be wound in continuous form in a roll or on a spool.

Figure 2:
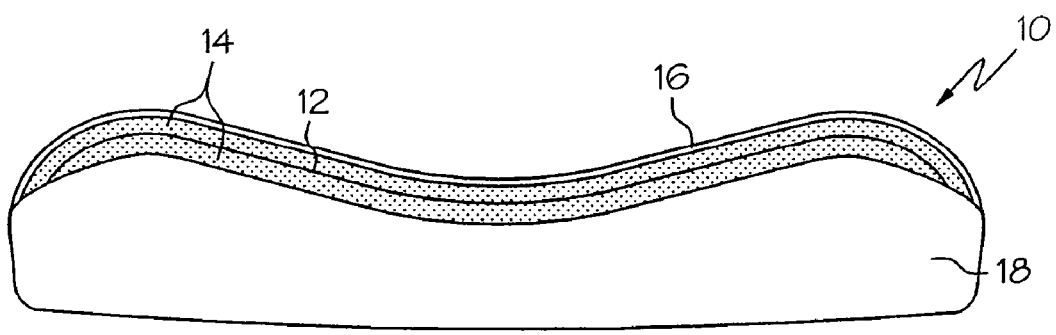
FIG. 2 is a side view of the tape adhered to a first substrate.

As shown in FIG. 2, the heat-resistant tape 10 is preferably adhered to a first substrate 18 such as an automotive or appliance trim part. The substrate surface should be clean (i.e., free of oils and other contaminants) to allow proper adhesion. Depending on the type of substrate, an adhesion promoter or primer may be applied to the substrate surface prior to application of the tape. The tape is flexible so as to match the topology of the substrate, thus it curves and conforms to the substrate. While the tape is illustrated on only one area of the substrate, it should be appreciated that multiple pieces of tape may be applied to different areas of the substrate. Alternatively, the tape may be substantially coextensive with the surface of the substrates. The tape may also be formed into different sizes or shapes as needed, for example, in use with die-cut parts and extruded profiles.

Figure 3:
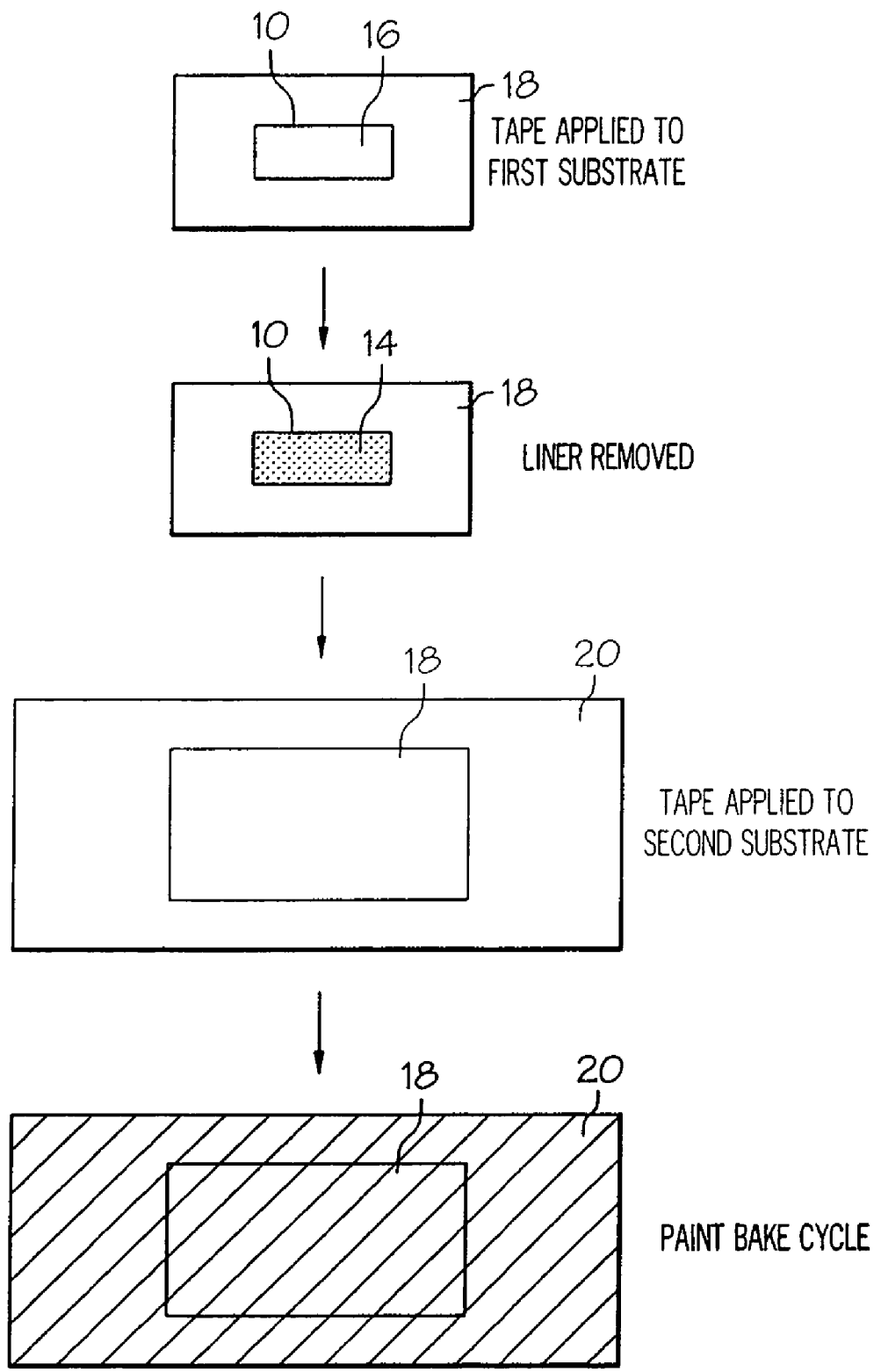
FIG. 3 is a flow diagram illustrating the method of applying the tape to two substrates and passing the substrates through a paint bake cycle.

FIG. 3 illustrates, in flow chart form, a preferred embodiment of the invention in which the tape 10 is adhered on one side to a first substrate 18 such as an automotive or appliance trim part. Liner 16 is removed to expose the opposite surface of adhesive 14. The tape is then adhered on the other side to a second substrate 20 such as an exterior automotive or appliance part. The tape may be adhered to a wide variety of substrates including, but not limited to, wood, glass, metal, thermoplastic olefins, acrylonitrile butadiene styrene, polyvinyl chloride-based materials, reaction injection molded parts, and clear coated parts. In automotive applications, the first substrate may be in the form of exterior trim including body side molding, wheel well flares, reveal moldings, roof ditches, and other paintable parts, and the second substrate may be in the form of an exterior automotive part. In appliance applications, the first substrate may be in the form of metal trim, casements, or other paintable parts, and the second substrate may comprise the exterior portion of the appliance.

After application of the tape 10 to the first and second substrates 18, 20, the substrates with the tape in between are then painted and processed through a paint bake cycle as shown. The paint bake cycle typically lasts for about 30 minutes at a temperature of about 250° F. (120° C.). The substrates may optionally be coated with a primer prior to painting. In the method of the present invention, the paint used in the paint bake cycle is preferably an epoxy, urethane, or acrylic-based paint. The paint may be a powder-based paint or a conventional automotive solvent-based paint, which may or may not include a powder-based paint.

While the tape has been described herein as being applied to two substrates with the liner removed first, it should be appreciated that it is also possible to apply one side of the tape to a substrate with the liner attached on the opposite side, and then process the substrate with the tape and liner attached through a paint bake cycle prior to removing the liner and attaching the other side of the tape to a second substrate.

In order that the invention may be more readily understood, reference is made to the following examples which are intended to illustrate the invention, but not limit the scope thereof.

EXAMPLE 1

A number of polyolefin-based release liners supplied from Achilles USA, Inc. were subjected to a number of tests to determine tear strength and Elmendorf tear under a variety of conditions. For comparative purposes, a number of polyvinyl chloride-based liners were subjected to the same conditions. The results are shown below in Tables 1, 3 and 5.

Tables 2, 4 and 6 indicate release values of polyvinyl chloride-based liners and polyolefin-based liners from a solid core acrylic tape available from Adco Products, Inc. under the trade name AT-3, as well as the adhesion of the acrylic tape to aluminum. The release and adhesion values are indicated after the tapes have been subjected to various paint bake processes.

TABLE 1

Comparative examples - polyvinyl chloride (PVC) liner

| Physical Property | Test Method | Sample 1 | Sample 2 | Sample 3 | Sample 4 |
| --- | --- | --- | --- | --- | --- |
| Film Color | Visual | Dark Gray | Dark Gray | Light Gray | Cream |
| Base Polymer | FT-IR | PVC | PVC | PVC | PVC |
| Thickness | ASTM D 3652 | 6 mils | 10 mils | 7 mils | 8 mils |
| Tensile Strength | ASTM D 412 | 2600 psi | 2600 psi | 3300 psi | 3625 psi |
| Percent Elongation | ASTM D 412 | 250% | 325% | 200% | 250% |
| Tear Strength, calculated value | ASTM D 624 | 433 lbf/inch | 440 lbf/inch | 529 lbf/inch | 463 lbf/inch |
| Tear Strength, calculated value | ASTM D 624 | 76 kN/m | 77 kN/m | 93 kN/m | 81 kN/m |
| Tear Strength, actual value | ASTM D 624 | 2.6 lbs. | 4.4 lbs. | 3.7 lbs. | 3.7 lbs. |
| Elmendorf Tear, machine direction | ASTM D 1922 | 89.4 g/mil | 234.6 g/mil | Not Available | 496.6 g/mil |
| Elmendorf Tear, transverse direction | ASTM D 1922 | 211.1 g/mil | 266.1 g/mil | Not Available | 585.2 g/mil |
| Release From Acrylic Tape, before bake | ASTM C 879 | Good | Good | Good | Good |
| Release From Acrylic Tape, after bake | ASTM C 879 | Good | Good | Good | Good |

TABLE 2

Comparative example - polyvinyl chloride (PVC) liner

|  | Sample 1 | Sample 2 | Sample 3 | Sample 4 (0.152 mm thick) | Sample 4 (0.254 mm thick) |
|---|---|---|---|---|---|
| Liner Release Before Bake, No Paint | 1.4 pli - M | 1.5 pli - G | 1.2 pli - G | 2.2 pli - G | 2.2 pli - G |
| Liner Release After Bake, No Paint | 1.2 pli - M | 1.0 pli - G | 1.0 pli - G | 1.5 pli - G | 1.5 pli - G |
| Liner Release After AdPro | 4.5 pli - M | 4.2 pli - M | 4.2 pli - M | 6.3 pli - G | 6.3 pli - G |
| Liner Release After Base Coat | 3.8 pli - M | 4.8 pli - G | 3.3 pli - M | 6.2 pli - G | 4.7 pli - G |
| Liner Release After Clear Coat | 5.3 pli - M | 5.8 pli - G | 4.6 pli - G | 6.6 pli - G | 6.1 pli - G |
| Liner Release After Entire Paint | 1.3 pli - G | 2.0 pli - G | 1.3 pli - M | 2.9 pli - G | 3.2 pli - G |
| Adhesion to Aluminum Before Bake, NP | 14.4 pli - M | 14.8 pli - G | 14.8 pli - G | 13.0 pli - G | 13.2 pli - G |
| Adhesion to Aluminum After Bake, NP | 12.0 pli - M | 9.2 pli - G | 11.5 pli - G | 11.7 pli - G | 9.6 pli - G |
| Adhesion to Aluminum After AdPro | 4.5 pli - M | 4.9 pli - M | 5.1 pli - M | 6.0 pli - G | 5.5 pli - G |
| Adhesion to Aluminum After Base Coat | 4.8 pli - M | 5.2 pli - G | 4.0 pli - G | 6.0 pli - G | 5.8 pli - G |
| Adhesion to Aluminum After Clear Coat | 4.4 pli - G | 4.6 pli - G | 4.4 pli - G | 5.9 pli - G | 5.2 pli - G |
| Adhesion to Aluminum After Entire Paint | 4.3 pli - G | 4.7 pli - G | 4.7 pli - M | 4.5 pli - G | 4.9 pli - G |

G—Gloss Side of Release Liner Adhered to Acrylic Adhesive
M—Matte Side of Release Liner Adhered to Acrylic Adhesive
NP—No Paint

TABLE 3

Polyolefin-based liner

| Physical Property | Test Method | FPP-1 | FPP-2 |
|---|---|---|---|
| Film Color | Visual | Light Blue | Opaque WH |
| Base Polymer | FT-IR | Polyolefin | Polyolefin |
| Thickness | ASTM D 3652 | 8 mils | 7 mils |
| Tensile Strength | ASTM D 412 | 1723 psi | 1632 psi |
| Percent Elongation | ASTM D 412 | 1100% | 650% |
| Tear Strength, calculated value | ASTM D 624 | 350 lbf/inch | 471 lbf/inch |
| Tear Strength, calculated value | ASTM D 624 | 61 kN/m | 83 kN/m |
| Tear Strength, actual value | ASTM D 624 | 2.8 lbs. | 3.3 lbs. |
| Release From Acrylic Tape, before bake | ASTM C 879 | Good | Good |
| Release From Acrylic Tape, after bake | ASTM C 879 | Good | Good |

TABLE 4

Polyolefin-based liner

|  | FPP-1 (G) | FPP-1 (M) | FPP-2 (G) | FPP-2 (M) |
|---|---|---|---|---|
| Liner Release Before Bake, No Paint | 3.0 pli | 3.0 pli | 2.4 pli | 4.4 pli |
| Liner Release After Bake, No Paint | 1.2 pli | 2.0 pli | 2.0 pli | 3.0 pli |
| Adhesion to Aluminum Before Bake, NP | 30.2 pli | 28.8 pli | 34.8 pli | 27.2 pli |
| Adhesion to Aluminum After Bake, NP | 34.4 pli | 32.2 pli | 34.0 pli | 34.8 pli |

G—Gloss Side of Release Liner Adhered to Acrylic Adhesive
M—Matte Side of Release Liner Adhered to Acrylic Adhesive
NP—No Paint

TABLE 5

Polyolefin-based liner

| Physical Property | Test Method | FPP-4.2 | FPP-4.3 |
|---|---|---|---|
| Film Color | Visual | Opaque WH | Opaque WH |
| Base Polymer | FT-IR | Polyolefin | Polyolefin |
| Thickness | ASTM D 3652 | 7 mils | 7 mils |
| Tensile Strength | ASTM D 412 | 4520 psi | 3646 psi |
| Percent Elongation | ASTM D 412 | 725% | 700% |
| Tear Strength, calculated value | ASTM D 624 | 607 lbf/inch | 544 lbf/inch |
| Tear Strength, calculated value | ASTM D 624 | 106 kN/m | 95 kN/m |
| Tear Strength, actual value | ASTM D 624 | 4.2 lbs. | 3.8 lbs. |
| Elmendorf Tear, machine direction | ASTM D 1922 | 202 g/mil | 220 g/mil |
| Elmendorf Tear, transverse direction | ASTM D 1922 | 361 g/mil | 367 g/mil |
| Release From Acrylic Tape, before bake | ASTM C 879 | Good | Good |
| Release From Acrylic Tape, after bake | ASTM C 879 | Good | Good |

TABLE 6

Polyolefin-based liner

|  | FPP-4.2 (G) | FPP-4.2 (M) | FPP-4.3 (G) | FPP-4.3 (M) |
|---|---|---|---|---|
| Liner Release Before Bake, No Paint | 4.0 pli | 2.6 pli | 0.4 pli | 0.4 pli |
| Liner Release After Bake, No Paint | 1.4 pli | 1.4 pli | 1.4 pli | 1.6 pli |
| Adhesion to Aluminum Before Bake, NP | 14 pli | 13 pli | 14 pli | 13 pli |
| Adhesion to Aluminum After Bake, NP | 18 pli | 20 pli | 22 pli | 19 pli |

G—Gloss Side of Release Liner Adhered to Acrylic Adhesive
M—Matte Side of Release Liner Adhered to Acrylic Adhesive
NP—No Paint As can be seen, the polyolefin-based release liners exhibit high tear strength and high Elmendorf tear. In addition, the acrylic tape with the polyolefin-based liner attached exhibits high peel adhesion to aluminum after a paint bake process.

It will be apparent to those skilled in the art that various changes may be made without departing from the scope of the invention which is not considered limited to what is described in the specification.

What is claimed is:

1. A conformable, heat resistant two-sided acrylic-based tape comprising:
    a solid acrylic-based carrier having first and second sides, and including pre-expanded polymeric microspheres;
    an acrylic-based adhesive on both side of said carrier; and
    a conformable heat resistant removable liner comprised of a polyolefin-based material adhered by said adhesive to at least one side of said carrier; and
    wherein said tape withstands temperatures up to 300° F.

2. The tape of claim 1 having a thickness of about 0.5 to 2.0 mm.

3. The tape of claim 1 having a peel strength of at least 20 N/cm after being processed through one paint bake cycle.

4. The tape of claim 1 wherein said pre-expanded polymeric microspheres have a diameter ranging from about 65 to 135 microns.

5. The tape of claim 1 wherein said pre-expanded polymeric microspheres have a concentration of about 4% by weight of the carrier.

6. The tape of claim 1 wherein said pre-expanded polymeric microspheres are heat resistant up to at least a temperature of 300° F.

7. The tape of claim 1 wherein said pre-expanded polymeric microspheres are hollow.

8. The tape of claim 1 wherein said microspheres have a concentration of about 4% by weight of the carrier.

* * * * *